(12) United States Patent
Perley et al.

(10) Patent No.: US 9,551,320 B2
(45) Date of Patent: Jan. 24, 2017

(54) ASYMMETRIC LOAD CONTROL FOR TORSION FATIGUE REDUCTION IN A WIND TURBINE TOWER

(71) Applicant: General Electric Company, Schenectady, NY (US)

(72) Inventors: Thomas Franklin Perley, Simpsonville, SC (US); Brandon Shane Gerber, Charleston, SC (US)

(73) Assignee: General Electric Company, Schenectady, NY (US)

( * ) Notice: Subject to any disclaimer, the term of this patent is extended or adjusted under 35 U.S.C. 154(b) by 1097 days.

(21) Appl. No.: 13/628,096

(22) Filed: Sep. 27, 2012

(65) Prior Publication Data
US 2014/0086747 A1  Mar. 27, 2014

(51) Int. Cl.
*F03D 7/04* (2006.01)
*F03D 11/04* (2006.01)
*F03D 7/02* (2006.01)

(52) U.S. Cl.
CPC ............. *F03D 7/0224* (2013.01); *F03D 7/024* (2013.01); *F03D 7/0292* (2013.01); *F03D 7/0296* (2013.01); *F05B 2240/9121* (2013.01); *F05B 2270/331* (2013.01); *F05B 2270/807* (2013.01); *F05B 2270/808* (2013.01); *Y02E 10/723* (2013.01); *Y02E 10/728* (2013.01)

(58) Field of Classification Search
CPC ...... F03D 7/0224; F03D 7/0292; F03D 7/024; F03D 7/0296; F03D 7/0264; Y02E 10/723; F05B 2270/807; F05B 2270/331; F05B 2270/808; F05B 2270/821; F05B 2240/9121
USPC .......................................... 416/1, 31–53, 61
See application file for complete search history.

(56) References Cited

U.S. PATENT DOCUMENTS

| | | | |
|---|---|---|---|
| 7,004,724 B2 | 2/2006 | Pierce et al. | |
| 7,118,339 B2 | 10/2006 | Moroz et al. | |
| 7,160,083 B2 | 1/2007 | Pierce et al. | |
| 2004/0151577 A1* | 8/2004 | Pierce | F03D 7/0204 415/4.1 |
| 2004/0151584 A1* | 8/2004 | Blakemore | F03D 7/0204 416/9 |
| 2010/0237617 A1* | 9/2010 | Vyas | F03D 7/043 290/44 |
| 2011/0133475 A1* | 6/2011 | Zheng | E04H 12/10 290/55 |
| 2012/0027589 A1 | 2/2012 | Haag et al. | |
| 2014/0015251 A1* | 1/2014 | Hammerum | F03D 7/0264 290/44 |

* cited by examiner

*Primary Examiner* — Christopher Verdier
(74) *Attorney, Agent, or Firm* — Dority & Manning, P.A.

(57) ABSTRACT

A method and system for reducing a torsional movement and/or a torsional loading of a tower of a wind turbine is disclosed includes generating a tower torsion signal with a detection system and providing the signal to an asymmetric load control assembly. The tower torsion signal may correspond to an actual torsional movement of the tower or a torsional loading of the tower. The asymmetric load control assembly is configured to mitigate an asymmetric load acting on the wind turbine using the tower torsion signal.

16 Claims, 5 Drawing Sheets

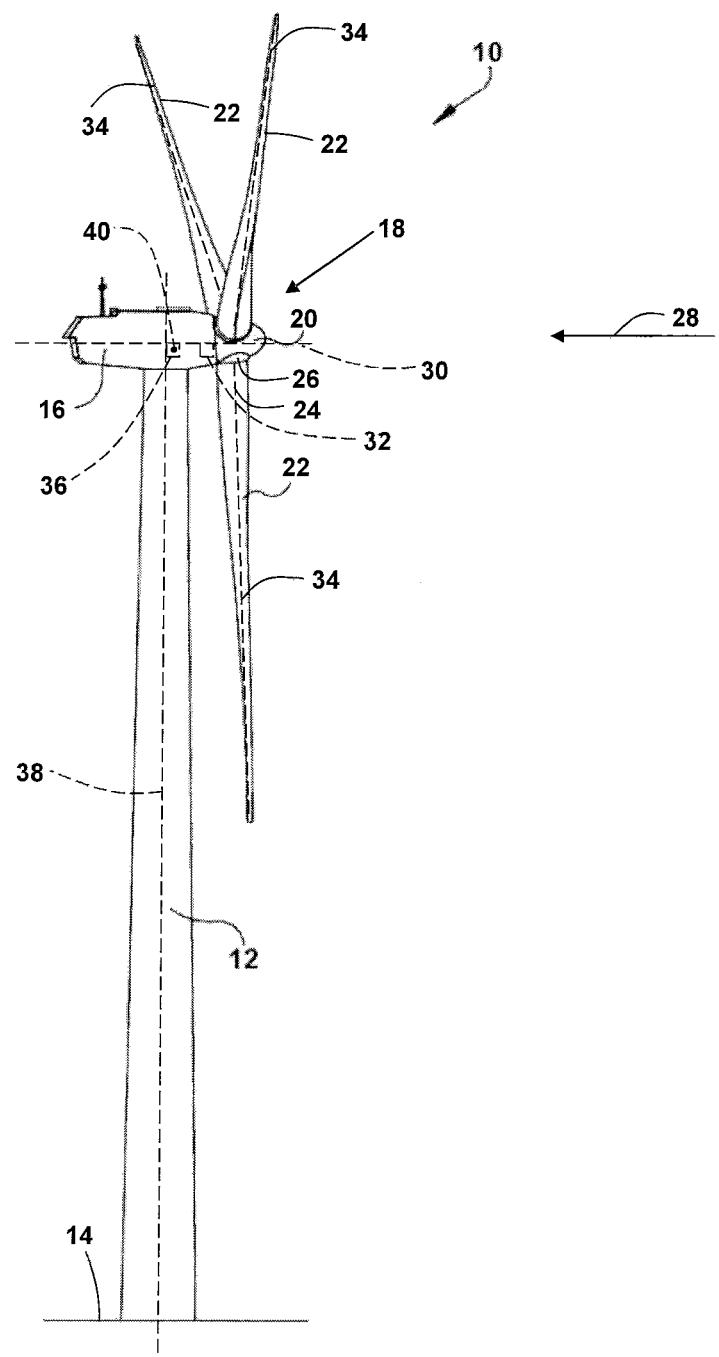
FIG. -1-

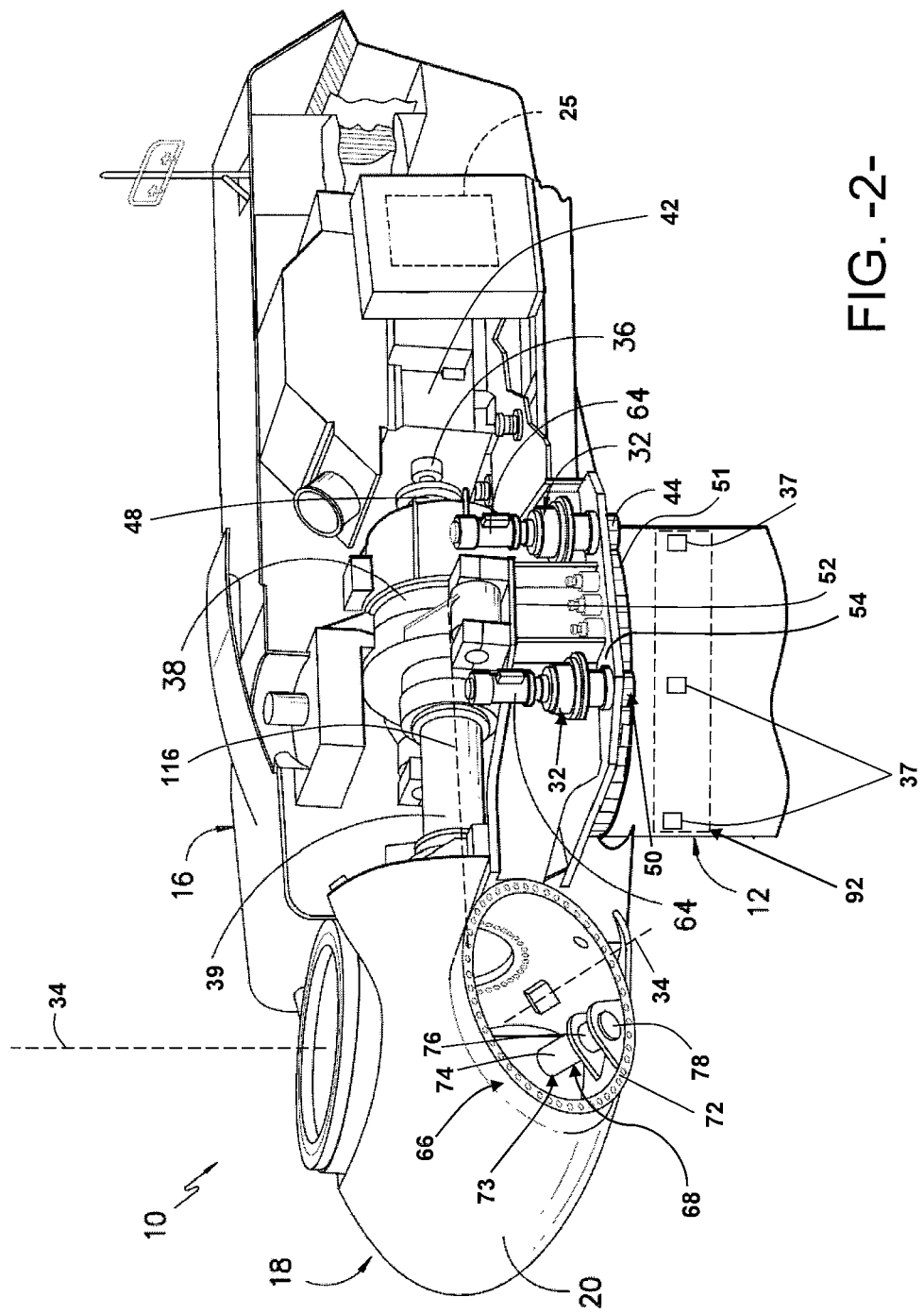
FIG. -2-

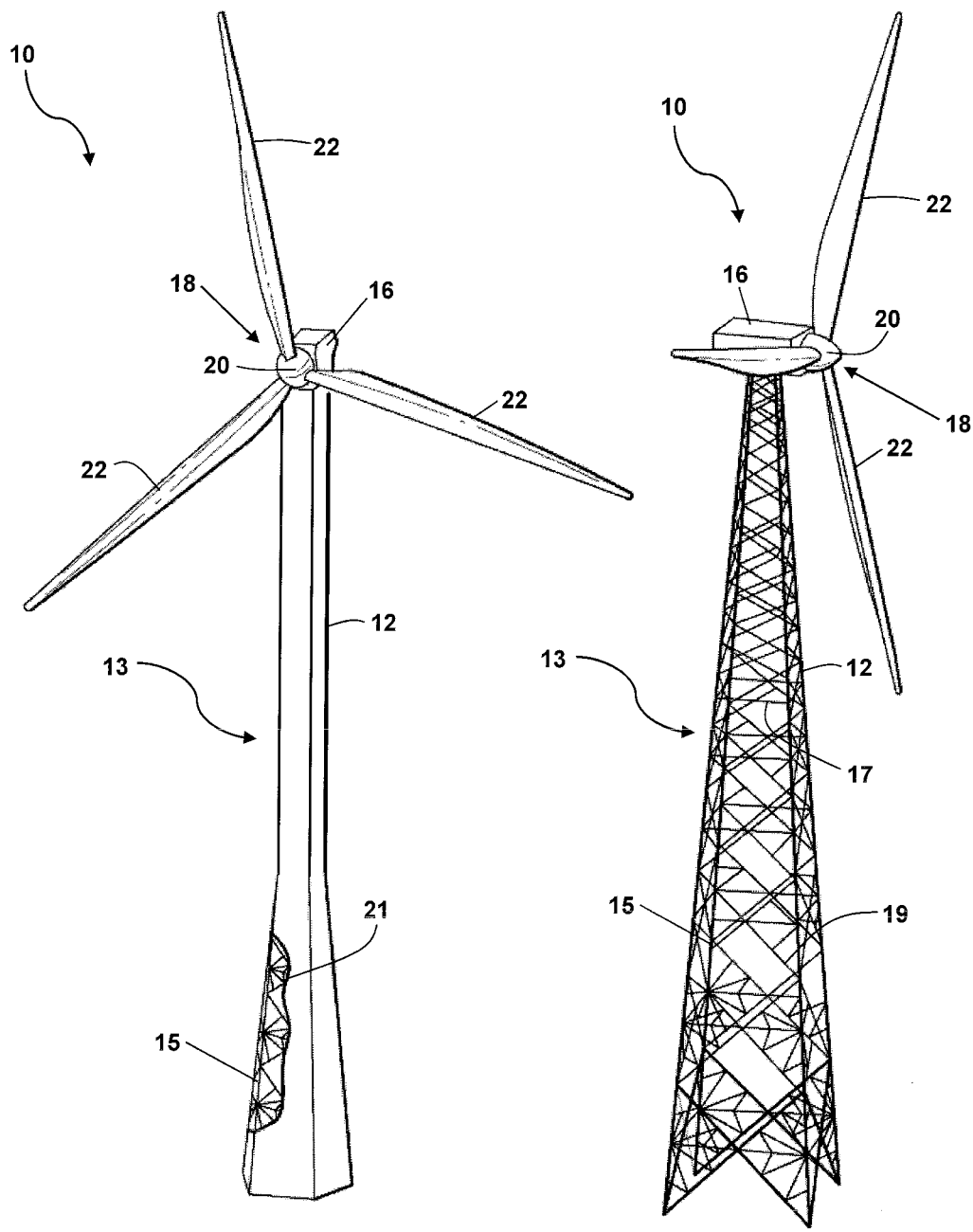
FIG. -3-  FIG. -4-

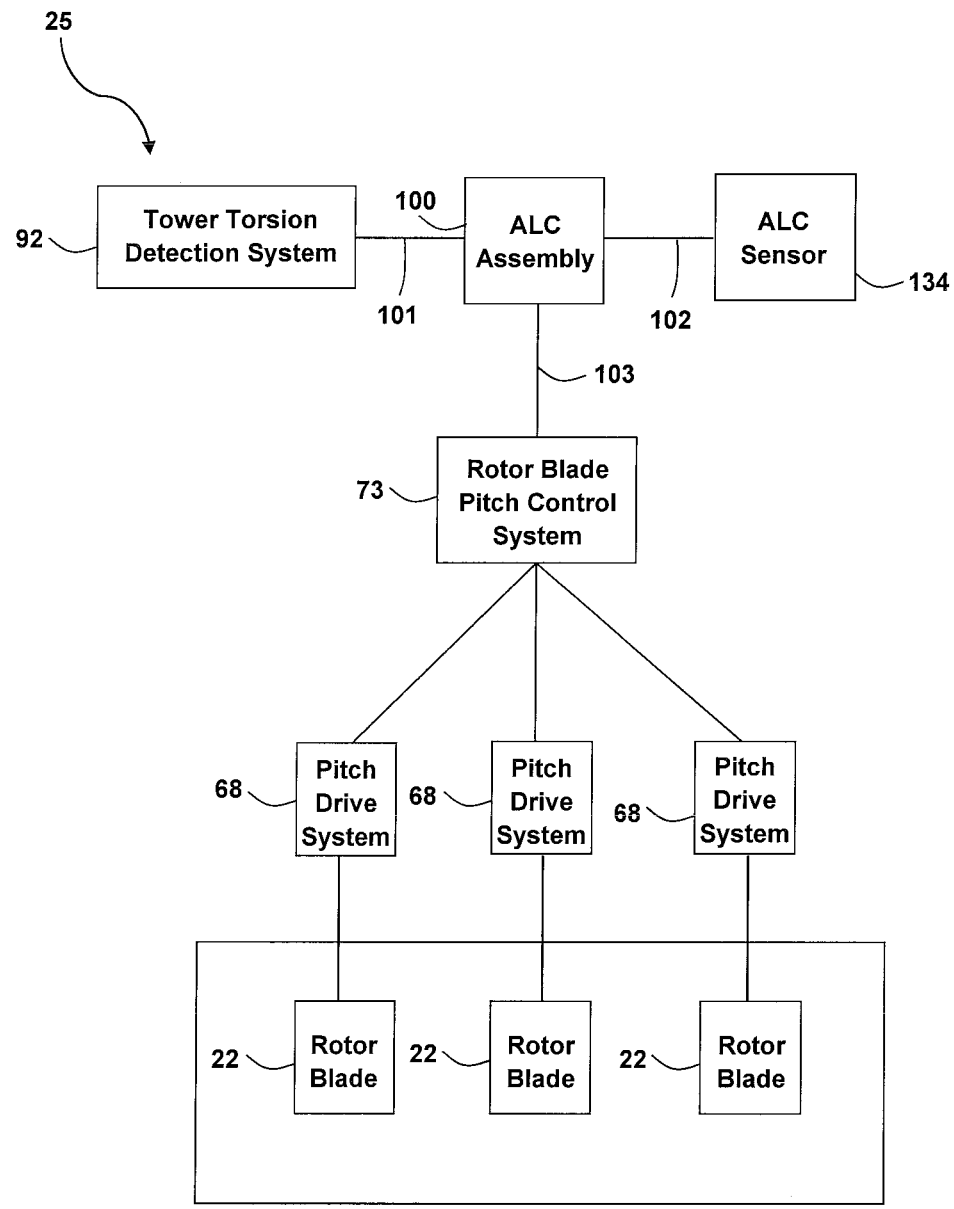
FIG. -5-

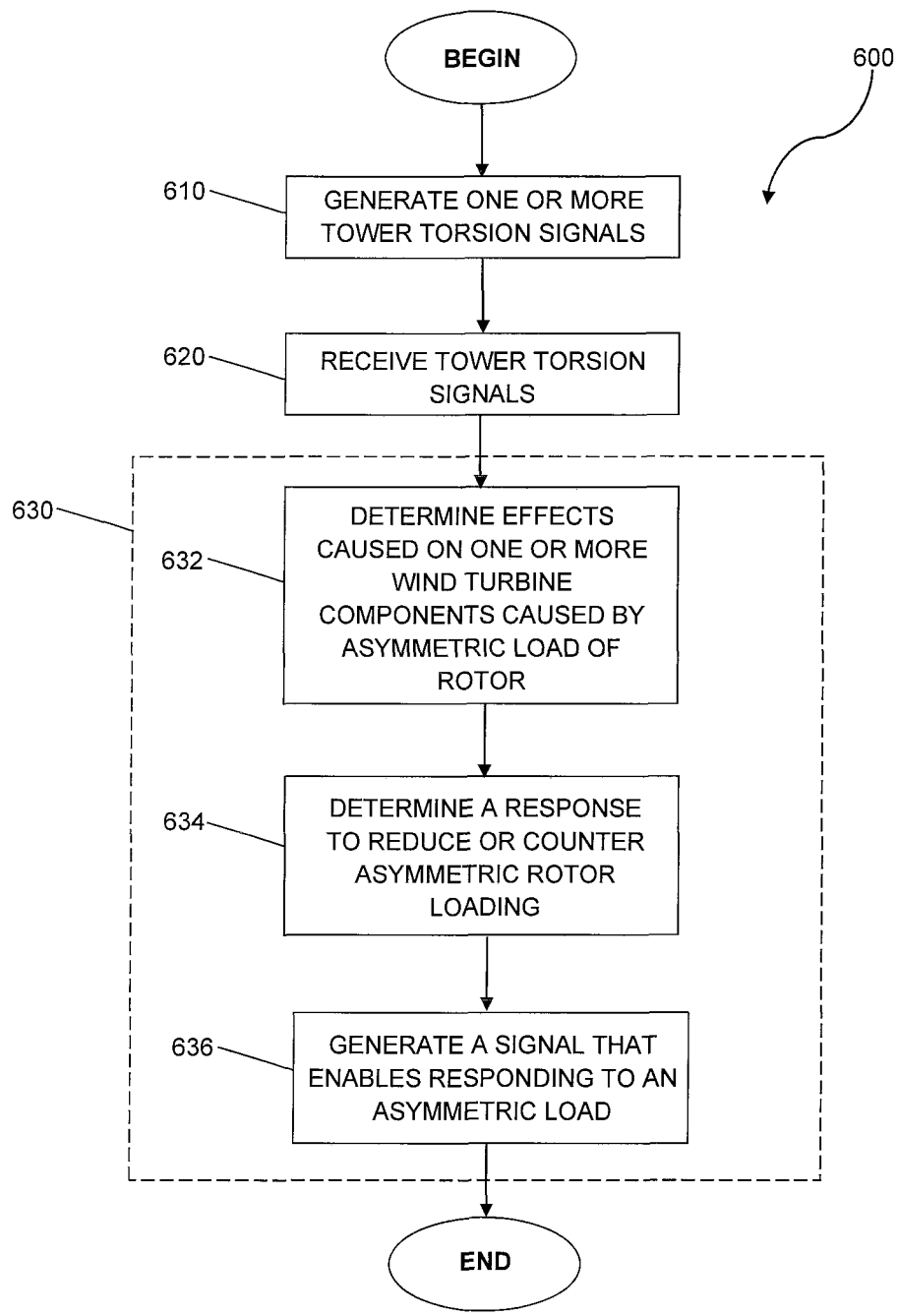
FIG. -6-

ASYMMETRIC LOAD CONTROL FOR TORSION FATIGUE REDUCTION IN A WIND TURBINE TOWER

FIELD OF THE INVENTION

The present invention relates generally to methods and systems for controlling wind turbines, and more particularly, to methods and systems for mitigating asymmetric loading of a wind turbine, thereby reducing torsional movement and/or torsional loading of a wind turbine tower.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Vertical and horizontal wind shears, yaw misalignment, and/or wind turbulence may act either collectively or individually for producing an asymmetric loading of the wind turbine. In particular, such an asymmetric loading may act across the wind turbine rotor. As a result, at least some elements of the wind turbine may be deformed. For example, the main shaft of the wind turbine may be bent (e.g., radially displaced) as a result of asymmetric rotor loading.

In order to mitigate the effect of the asymmetric loading of a wind turbine, conventional asymmetric load control (ALC) systems may use an array of sensors, such as proximity sensors, in the wind turbine to directly measure deformation of at least some elements of the wind turbine, such as a bending of the main shaft as described for example in U.S. Pat. No. 7,160,083 entitled Method and Apparatus for Wind Turbine Rotor Load Control. Further, a set of sensors for ALC may be provided in the yaw system to directly measure a yaw drive signal, such as described in U.S. Pat. Application No. 2012/0027589 entitled Method and Apparatus for Control of Asymmetric Loading of a Wind Turbine. In each instance, the ALC system uses signals generated by the ALC sensors for mitigating the effect of an asymmetric load of the rotor by, for example, controlling blade pitch and/or yaw alignment of the wind turbine. Accordingly, an ALC assembly may facilitate with reducing the effects of extreme loads and fatigue cycles acting on the wind turbine.

Current ALC assemblies, however, are only configured for detecting a limited number of deflections (i.e. main shaft deflection, fore-aft and side-side tower movement, and a yaw drive deflection), though new developments in tower technology have created a need for detecting additional loading parameters. For example, lattice tower structures, also known as space frame structures, utilize a highly engineered and optimized structure capable of handling unique static and dynamic loads that occur during wind turbine operation. Such tower structures, however, have generally lower torsional stiffness and frequencies. These characteristics greatly influence design costs and may make the tower more susceptible to twisting due to torsional loads that may frequently occur from asymmetric rotor loading. It would therefore be desirable to detect torsional movement and/or torsional loading in the tower before fatigue and extreme torsion occurs, thereby increasing the life of the tower.

Thus, an improved method and system for further reducing asymmetric loading and/or increasing the reliability of current ALC assemblies is desirable. Accordingly, a method and system for detecting and reducing torsional movement and/or torsional loading of a wind turbine tower would be advantageous.

BRIEF DESCRIPTION OF THE INVENTION

Aspects and advantages of the invention will be set forth in part in the following description, or may be obvious from the description, or may be learned through practice of the invention.

In one embodiment, a wind turbine according to the present invention is disclosed. The wind turbine includes a tower, a nacelle configured atop the tower, a rotor having a rotatable hub connected to a main shaft and at least one rotor blade, a tower torsion detection system operably configured to generate a tower torsion signal, and an asymmetric load control assembly. The tower torsion signal may correspond to an actual torsional movement of the tower or a torsional loading of the tower that may or may not be inducing actual torsional movement. Further, the asymmetric load control assembly is in communication with the tower torsion detection system to receive the tower torsion signal and to mitigate an asymmetric load acting on the wind turbine using the tower torsion signal.

In another embodiment, the tower torsion detection system may include a plurality of sensors circumferentially spaced relative to the tower to detect torsional movement and/or torsional loading of the tower. Further, the tower torsion detection system may generate a tower torsion signal based on the torsional movement and/or torsional loading. In additional embodiments, the wind turbine may include at least three sensors circumferentially spaced apart in a common, generally horizontal plane around the tower so as to detect a torsional movement and/or torsional loading of the tower. The sensors may be accelerometers, pressure sensors, strain gauges, or any combination thereof.

In yet another embodiment, the wind turbine may include a rotor blade pitch control system. The asymmetric load control assembly may be in communication with the pitch control system to mitigate the asymmetric load acting on the rotor by altering a pitch angle of the rotor blade. In still additional embodiments, the asymmetric load control assembly may be configured to mitigate the asymmetric load based directly on the tower torsion signal.

In additional embodiments, the asymmetric load control assembly may further include a sensor configured to directly or indirectly detect bending of the main shaft due to asymmetric loading of the rotor and may generate a corresponding asymmetric load signal. Further, the asymmetric load control assembly may be configured to mitigate the asymmetric load using the asymmetric load signal and the tower torsion signal. Additionally, the asymmetric load control assembly may be further configured to mitigate the asymmetric load directly based on the asymmetric load signal and use the tower torsion signal for validating the asymmetric load signal.

In still another embodiment, a method for operating a wind turbine is disclosed. The method includes: generating a tower torsion signal corresponding to an actual torsional movement of the tower or a torsional loading of the tower; and, mitigating an asymmetric load acting on the wind turbine using the tower torsion signal.

In additional embodiments, the method may further include mitigating the asymmetric load by altering the pitch angle of at least one rotor blade. Further, the method may include mitigating the asymmetric load directly based on the tower torsion signal. In still additional embodiments, the method may further comprise directly or indirectly detecting bending of the main shaft due to asymmetric loading of the rotor and generating a corresponding asymmetric load signal, wherein the asymmetric load is mitigated using the asymmetric load signal and the tower torsion signal.

In yet another embodiment, a control system for a wind turbine is disclosed. The control system includes an asymmetric load control assembly configured to receive a tower torsion signal and mitigate an asymmetric load acting on the rotor using the tower torsion signal. The tower torsion signal may correspond to an actual torsional movement of the tower or a torsional loading of the tower. Further, the control system may be configured to adjust a pitch angle of at least one rotor blade of the wind turbine so as to reduce the asymmetric load acting on the rotor. In still further embodiments, the asymmetric load control assembly may further include a sensor configured to directly or indirectly detect bending of the main shaft due to asymmetric loading of the rotor, and to generate a corresponding asymmetric load signal. It should be understood that the asymmetric load control assembly of the control system may further include all the limitations described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a nacelle configured atop a tower of a wind turbine according to the present disclosure;

FIG. 3 illustrates a perspective view of one embodiment of a wind turbine tower having a lattice structure according to the present disclosure;

FIG. 4 illustrates another perspective view of one embodiment of a wind turbine tower having a lattice structure according to the present disclosure;

FIG. 5 illustrates a block diagram of a control system for controlling the wind turbine according the present disclosure; and FIG. 6 illustrates a flow chart of a method for detecting and reducing a torsional movement and/or torsional loading of a tower of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned above, vertical and horizontal wind shears, yaw misalignment, and/or turbulence may act individually or together to produce asymmetric loading across a wind turbine rotor. The resultant asymmetric load produces a bending moment in the rotor blades that is reacted through the hub and subsequently to other wind turbine components. Such asymmetric loading may cause deformations of elements in the wind turbine, including, for example, bending or radial displacement of the main shaft or a torsional movement and/or torsional loading of the tower. More specifically, torsional movement and/or torsional loading of a wind turbine tower may exist more frequently in lattice tower structures. Such structures may have relatively low torsional stiffness and frequencies (as compared to tubular tower structures), wherein the tower may be more susceptible to twisting or torsional deformation. A "torsional movement" is used herein to refer to any torsional deformation, including twisting or rotational movement relative to the vertical axis of a wind turbine tower.

The embodiments described herein facilitate reducing asymmetric loading acting on the rotor of a wind turbine, thereby reducing torsional loading and/or torsional movement of the tower and deformations of the main shaft. Further, embodiments herein may increase reliability of asymmetric load control (ALC) of a wind turbine.

In particular, a wind turbine including a tower, a nacelle, a rotor having a rotatable hub connected to a main shaft and at least one rotor blade, a tower torsion detection system operably configured to generate a tower torsion signal, and an asymmetric load control assembly is disclosed. The tower torsion signal may correspond to an actual torsional movement of the tower or a torsional loading of the tower. Further, the asymmetric load control assembly is in communication with the tower torsion detection system to receive the tower torsion signal. Moreover, the asymmetric load control assembly is further configured to mitigate an asymmetric load acting on the wind turbine using the tower torsion signal.

The asymmetric load control assembly (hereinafter referred to as the ALC assembly) is configured for receiving a tower torsion signal generated by a tower torsion detection system. The tower torsion signal may then be used to determine the magnitude and/or the orientation of the resultant rotor load. The ALC assembly may then use the tower torsion signal in any type of open or closed loop feedback control scheme for mitigating an asymmetric load. Mitigating asymmetric loads may include reducing or countering asymmetric rotor loading. Thereby, the ALC assembly is configured for causing a more symmetric load on the rotor. The ALC assembly may mitigate the asymmetric load by adequately pitching the blades of the wind turbine.

Further, the ALC assembly may mitigate the asymmetric loads directly based on the tower torsion signal. In other words, the torsion signal is the primary signal that is measured and corrected for in subsequent control/corrective actions. For example, the ALC assembly may implement a control scheme configured to produce a control signal based on the tower torsion signal for reducing the asymmetric loads (discussed further in regards to FIG. 5 below) as reflected by a change (e.g., reduction) of the tower torsion signal. Alternatively, or in addition thereto, the wind turbine may implement an ALC sensor for directly sensing asymmetric loads acting on the rotor. In such embodiments, the ALC assembly may mitigate the asymmetric loads directly based on the measurements of the ALC sensor and use the tower torsion signal for validating the measurements. Thereby, embodiments herein may facilitate increasing reliability of ALC of the wind turbine.

In a wind turbine implementing an ALC sensor, the tower torsion signal may also be used for redundancy purposes in the instance of ALC sensor failure. Further, the tower torsion signal may also be used in combination with the measurements of the ALC sensor for generating an ALC signal.

Referring now to the figures, FIG. 1 is a perspective view of an exemplary wind turbine 10. In the exemplary embodiment, the wind turbine 10 is a horizontal-axis wind turbine. Further, the wind turbine 10 includes a tower 12 that extends from a support system 14, a nacelle 16 mounted on tower 12, and a rotor 18 that is coupled to nacelle 16. The rotor 18 includes a rotatable hub 20 connected to a main shaft (not shown) and at least one rotor blade 22 coupled to and extending outward from hub 20. In the exemplary embodiment, rotor 18 has three rotor blades 22. In an alternative embodiment, rotor 18 may include more or less than three rotor blades 22.

Rotor blades 22 are spaced about hub 20 to facilitate rotation of the rotor 18 to enable kinetic energy to be transferred from the wind into usable mechanical energy, and subsequently, electrical energy. The rotor blades 22 may be mated to the hub 20 by coupling a blade root portion 24 to the hub 20 at a plurality of load transfer regions 26. Load transfer regions 26 have a hub load transfer region and a blade load transfer region (both not shown in FIG. 1). Loads induced to rotor blades 22 are transferred to the hub 20 via load transfer regions 26.

The rotor blades 22 may have any suitable length that enables the wind turbine 10 to function as described herein. As wind strikes the rotor blades 22 from a direction 28, the rotor 18 is rotated about an axis of rotation 30. As the rotor blades 22 are rotated and subjected to centrifugal forces, they are also subjected to various forces and moments. As such, the rotor blades 22 may deflect and/or rotate from a neutral, or non-deflected, position to a deflected position.

Moreover, a pitch angle or blade pitch of rotor blades 22 (i.e., an angle that determines the perspective of the rotor blades 22 with respect to direction 28 of the wind), may be changed by a rotor blade pitch control system 32 to control the load and power generated by the wind turbine 10. For example, during operation of wind turbine 10, the blade pitch control system 32 may rotate the pitch of the rotor blades 22 about pitch axes 34, such that the rotor blades 22 are moved to a feathered position, which facilitates reducing a rotational speed of the rotor 18 and/or facilitates a stall of the rotor 18. In an exemplary embodiment, the pitch of each rotor blade 22 is controlled individually by a control system 25 (FIG. 2). Alternatively, the pitch for all rotor blades 22 may be controlled simultaneously by control system 25.

Referring now to FIG. 2, an enlarged sectional view of a portion of a nacelle 16 atop a tower 12 of a wind turbine 10 is illustrated. In the exemplary embodiment, the wind turbine 10 includes a nacelle 16 and a rotor 18. The rotor 18 includes hub 20 rotatably coupled to the nacelle 16. More specifically, the hub 20 is rotatably coupled to an electric generator 42 positioned within nacelle 16 by rotor shaft 39 (also referred to as either a main shaft or a low speed shaft), a gearbox 38, a high speed shaft 48, and a coupling 36. In an exemplary embodiment, the rotor shaft 39 is disposed coaxial to longitudinal axis 116. Rotation of the main shaft 39 drives the gearbox 38 that subsequently drives the high speed shaft 48. The high speed shaft 48 drives the generator 42 with the coupling 36. Further, rotation of the high speed shaft 48 facilitates production of electrical power by the generator 42. The gearbox 38 and generator 42 are supported by a supports 52, 54.

Still referring to FIG. 2, the wind turbine 10 includes a tower torsion detection system 92, as indicated by the dotted lines. The tower torsion detection system 92 may include sensors 37 located in any suitable location on or near the tower 12 so as to infer a torsional movement and/or torsional loading of the tower. For example, as illustrated, the sensors 37 are circumferentially spaced relative to the tower 12. More specifically, the sensors 37 are circumferentially spaced apart in a common, generally horizontal plane around the tower so as to detect torsional movement and/or torsional loading of the tower 12. For example, a torsional signal of generally equal magnitude sensed on the plurality of sensors 37 disposed in a common horizontal plane is an indicator of torsional distortion as compared to a bending of the tower in a side-to-side or back-to-front direction. In other embodiments, the sensors 37 may be located on, near, or within the tower 12 or the nacelle 16, or any combination thereof. The sensors 37 may also be located in the yaw system 50. For example, the sensors 37 may be located between the pinion and rack in the yaw gears 44 (not shown).

In one embodiment, any number of sensors 37 may be employed to detect a torsional movement and/or torsional loading of the tower 12. For example, as illustrated in FIG. 2, there are three sensors 37. In other embodiments, more than three sensors may be employed. In still additional embodiments, less than three sensors may be employed.

Additionally, the tower torsion detection system 92 may include any suitable type of sensor capable of inferring a torsional loading and/or movement of the tower 12. For example, in one embodiment, the sensors may be a triad of accelerometers circumferentially spaced relative to the tower so as to detect torsional movement and/or torsional loading of the tower. In additional embodiments, the sensors 37 may be inertial measurement unit (IMU) sensors or miniature inertial measurement unit (MIMU) sensors. In still additional embodiments, pressure sensors may be employed, such as in the yaw system 50 between the pinion and rack (not shown) in the yaw gears 44. In still additional embodiments, the sensors 37 may be strain gauges. It should be understood that any combination of sensors mentioned herein or other suitable sensor may be employed in the present invention.

Moreover, the tower torsion detection system 92 is not limited to using sensors, but may include any suitable means for measuring a torsional movement and/or torsional loading of the tower 12. Further, it should be understood that the tower torsion detection system 92 may include any suitable means for reducing a torsional loading and/or movement of the tower 12. For example, the means for reducing torsional movement and/or torsional loading of the tower may also include varying the orientation of the nacelle 16 in relation to the wind direction 28.

Still referring to FIG. 2, the hub 20 may further include a pitch assembly 66. Pitch assembly 66 may include a rotor blade pitch control system 73 operatively coupled to one or more pitch drive systems 68. Each pitch drive system 68 is coupled to a respective rotor blade 22 (shown in FIG. 1) for altering the pitch of the associated rotor blade 22 along pitch axis 34. Only one of three pitch drive systems 68 is shown in FIG. 2. It should be understood that the blade pitch control system 73 may be a centralized controller associated to a plurality of pitch drive systems 68, such as shown in FIG. 5. Alternatively, the wind turbine 10 may include a distributed blade pitch control system 73 including, for example, a plurality of blade pitch control systems, each being associated to a respective pitch drive system 68.

In the exemplary embodiment, the pitch assembly 66 includes at least one pitch bearing 72 coupled to hub 20 and to the respective rotor blade 22. Further, the pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to the pitch drive pinion 78 such that the rotation of the pitch drive pinion 78 causes rotation of the pitch bearing 72. More specifically, the pitch drive pinion 78 is coupled to the pitch bearing 72 such that rotation of the pitch drive gearbox 76 rotates the pitch bearing 72 and the rotor blade 22 about the pitch axis 34 so as to change the pitch of the rotor blade 22.

The pitch drive system 68 may be coupled to the control system 25 for adjusting the pitch of the rotor blade 22 upon receipt of one or more signals from the control system 25. The pitch drive motor 74 may be any suitable motor driven by electrical power, pneumatic system and/or a hydraulic system that enables the pitch assembly 66 to function as described herein. Alternatively, the pitch assembly 66 may include any suitable structure, configuration, arrangement, and/or components such as, but not limited to, hydraulic cylinders, springs, and/or servo-mechanisms. Moreover, the pitch assembly 66 may be driven by any suitable means such as, but not limited to, hydraulic fluid, and/or mechanical power, such as, but not limited to, induced spring forces and/or electromagnetic forces.

As mentioned previously, the wind turbine 10 may also include a yaw system 50 that may be used to rotate nacelle 16 and hub 20 about yaw axis 38 (shown in FIG. 1). The yaw system 50 may be placed at the joint between the tower 12 and the nacelle 16. Further, the yaw system 50 may collaborate with a yaw drive mechanism 32 for rotating the nacelle 16. Each yaw drive mechanism 32 may include a yaw motor 64 coupled to a yaw gear 44 configured to engage the yaw bearing 51.

Referring now to FIGS. 1, 3, and 4, the tower 12 of the present invention may be fabricated from tubular steel that extends between the support system 14 and the nacelle 16, as shown in FIG. 1. In an exemplary embodiment, the tower 12 may be fabricated from a lattice structure as shown in FIGS. 3 and 4. Lattice tower structures utilize a highly engineered and optimized structure capable of handling unique static and dynamic loads that occur during wind turbine operation. As illustrated, each wind turbine 10 having a lattice tower structure 13 includes a rotor 18 having a plurality of rotor blades 22 mounted to a hub 20. The rotor 18 is coupled to the nacelle 16, which is supported atop the tower 12.

The lattice tower structure 13 is formed by vertically oriented legs 15, horizontal braces 17, and diagonal braces 19. The legs 15 are typically angle iron members or pipe members, and the braces 17, 19 are typically angle iron members. As mentioned, these lattice tower structures 13 are also referred to in the art as space frame towers. The lattice tower structure 13 may be fabricated in sections and erected at the wind turbine site. In the embodiment of FIG. 3, a cladding material 21 is applied over the lattice structure, which may be any type of suitable fabric, such as an architectural fabric designed for harsh weather conditions. The cladding 21 protects workers and equipment within the tower and provides an aesthetic appearance to the wind turbine 10.

Though lattice tower structures offer many benefits as described herein, they may have low torsional stiffness and frequencies. As mentioned, such characteristics greatly influence design costs and may make the tower more susceptible to twisting due to torsional loading that may frequently occur due to asymmetric rotor loading. The present invention, therefore, is capable of detecting a torsional movement and/or torsional loading of these lattice structures before fatigue and extreme torsion occurs, thereby increasing the life of the tower.

Referring now to FIG. 5, a block diagram of a control system 25 for controlling the wind turbine 10 is illustrated. The control system 25 may implement a number of control actions, including, but not limited to, yaw control, ALC pitch control, and management of ALC sensors. The exemplary system 25 includes the ALC assembly 100 configured to receive a tower torsion signal 101 generated by the tower torsion detection system 92 and mitigate an asymmetric load acting on the wind turbine rotor.

Optionally, the ALC assembly 100 may be operatively connected to one or more ALC sensors 134. The ALC sensors 134 may be configured to receive signals corresponding to direct measurements of effects caused by an asymmetric rotor loading such as, but not limited to, a bending or radial displacement of the main shaft 39 (FIG. 2). More specifically, the ALC sensor 134 may be a proximity sensor that measures displacement or strain of the shaft 39 using sensor technologies based on acoustic, optical, magnetic, capacitive or inductive field effects. In FIG. 5, only one sensor 134 is illustrated, though it should be understood that a plurality of sensors may also be employed to measure displacement of the main shaft 39 caused by an asymmetric load.

The ALC assembly 100 may analyze the tower torsion signal 101 and/or the ALC signal 102 to determine an asymmetric load acting on rotor 18. The tower torsion signal 101 may correspond to an actual torsional movement or a torsional loading of the tower 12. The ALC assembly 100 will then generate information for mitigating the asymmetric load. Alternatively or in addition thereto, the ALC assembly 100 may use one of these signals for validating a reference signal used for ALC or as a redundant data. Further, the ALC assembly 100 may be configured to generate an ALC signal based on the received signal(s) for mitigating an asymmetric loading.

According to the exemplary scheme of FIG. 5, and other embodiments described herein, the ALC assembly 100 is operatively connected to a rotor blade pitch control system 73 configured to alter the pitch of at least one of the rotor blades 22. The blade pitch control system 73 receives the ALC assembly signal 103 and, based on this signal 103, operates at least one of the pitch drive systems 68 for mitigating an asymmetric loading acting on the rotor 18.

According to at least some embodiments herein, the ALC assembly 100 is configured to mitigate an asymmetric load directly based on a tower torsion signal 101. That is, the ALC assembly 100 may be configured for determining an ALC assembly signal 103 facilitating mitigation of an asymmetric rotor loading directly based on the reference data contained in the tower torsion signal 101. Thereby, ALC may be implemented using information generated by the tower torsion detection system 92. The tower torsion signal 101 is typically suitable for directly implementing ALC since the signal 101 typically provides information, which can be correlated to a torsional movement and/or torsional loading of the tower 12 caused by an asymmetric load of the wind turbine 10. Further, the tower torsion signal 101 may be generated in analog and/or digital format.

As set forth above, the ALC assembly 100 may be configured to mitigate an asymmetric rotor loading by pitching at least one of the rotor blades 22. In particular, the tower torsion signal 101 and/or the ALC signal 102 may be used to determine a pitch for each of the rotor blades 22. For example, the tower torsion signal 101 may be used to estimate a torsional movement and/or torsional loading and, thereby, the magnitude and/or phase angle of asymmetric rotor loading. The estimated magnitude and/or phase angle can then be used to determine a blade pitch for at least one of rotor blades 22 to reduce the asymmetric rotor loading. The pitch may be determined using information solely from the tower torsion signal 101 or from both the tower torsion signal 101 and the ALC signal 102

In an exemplary embodiment, the tower torsion detection system 92 typically provides a tower torsion signal 101 having a high quality. Thereby, reliability of ALC may be further improved by using the tower torsion signal 101 for mitigating an asymmetric rotor loading. For example, the ALC assembly 100 may be configured to mitigate an asymmetric load using a tower torsion signal 101 generated by the tower torsion detection system 92 and an ALC signal 102 generated by the ALC sensor(s) 134. Thereby, reliability of ALC may be increased. Additionally, in some embodiments, the ALC assembly 100 is configured to 1) perform ALC based on the signal provided by ALC sensors and 2) use the tower torsion signal 101 for evaluating and/or validating performance of the ALC sensor(s) 134. According to other embodiments, the ALC assembly 100 is configured to use the tower torsion signal 101 only as a redundant signal in the instance of ALC sensor failure. Further, the ALC assembly 100 may be configured to mitigate an asymmetric load based on the combination of the ALC signal 102 and the tower torsion signal 101.

FIG. 2 illustrates the control system 25 as being centralized within the nacelle 16, however, the control system 25 may be a distributed system throughout wind turbine 10, on support system 14, within a wind farm, and/or at a remote control center. Further, the control system 25 typically includes a processor (not shown) configured to perform the methods and/or steps described herein. As used herein, the term "processor" broadly refers to a controller, a microcontroller, a microcomputer, a programmable logic controller (PLC), a field programmable gate array (FPGA), an application specific integrated circuit, and other programmable circuits. Further, these terms may be used interchangeably herein.

Additionally, it should be understood that the control system 25 may also include memory, input channels, and/or output channels. In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

In the exemplary embodiment, the control system 25 may include a real-time controller having any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, the controller may be a microprocessor that includes read-only memory (ROM) and/or random access memory (RAM), such as, for example, a 32 bit microcomputer with 2 Mbit ROM, and 64 Kbit RAM.

Referring now to FIG. 6, a flow chart of an exemplary method 600 of operating the wind turbine 10 is illustrated. Method 600 may include generating 610 one or more tower torsion signal(s) appropriate for being used for ALC of the wind turbine 10. According to embodiments herein, the tower torsion signal is generated by the tower torsion detection system 92, as described above. According to at least some embodiments described herein, an ALC signal may be generated by the ALC sensor 134 in addition to the tower torsion signal.

Method 600 may further include receiving 620 the tower torsion signal and optionally, the ALC signal, generated by the ALC sensor. Typically, these signals are received by the ALC assembly 100. Further, the components of the ALC assembly 100 receiving the signals (e.g., a processor or an analog to digital converter) are coupled to the elements of the wind turbine 10 used for detecting an asymmetric load (e.g., tower torsion detection system 92 and/or ALC sensor 134). The ALC assembly 100 may convert these signals to a usable format, if required. Method 600 further includes mitigating 630 an asymmetric load acting on the rotor 18 using the signals for ALC, namely the tower torsion signal and, optionally, the ALC signal.

Mitigating 630 the asymmetric load may further include a step 632 for determining the effects (e.g., loads) caused on one or more components of the wind turbine 10 by an asymmetric load of the rotor 18 using the signals for ALC. For example, the control system 25 may use any suitable means to convert the input data to relevant asymmetric load data (e.g., a torsional loading and/or torsional movement of the tower and a main shaft deflection). Step 632 may also include determining the load on the rotor blades 22 as well as any properties of an asymmetric rotor loading.

Mitigating 630 the asymmetric load may also include a step 634 for determining a response to reduce or counter the asymmetric rotor loading. For example, in response to a particular asymmetric rotor loading, the control system 25 may determine that the response should be to change the pitch of one or more rotor blades 22. As another example, the determined response may be applying a brake to stop or slow rotation of the hub 20.

Mitigating 630 the asymmetric load may additionally include a step 636 for generating a signal that enables responding to the asymmetric load. For example, a response signal may be generated in the form of, for example, a set of control signals transmitted over individual control lines, to cause the blade pitch control system 73 to change the pitch of one or more of the rotor blades 22. If the selected response fails to cause the wind turbine 10 to operate within an acceptable operating range, method 600 can be repeated as often as necessary or even discontinued, resulting in a pitch control without the benefits of the described ALC algorithm(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
   a lattice structure tower;
   a nacelle configured atop the tower;
   a rotor comprising a rotatable hub connected to a main shaft, and at least one rotor blade;
   a tower torsion detection system comprising a plurality of sensors circumferentially spaced about the lattice structure tower, the plurality of sensors operably configured to generate a tower torsion signal, wherein the tower torsion signal is at least one of: i) an actual torsional movement of the lattice structure tower, or ii) a torsional loading of the lattice structure tower; and,
   an asymmetric load control assembly communicatively coupled to the tower torsion detection system, the asymmetric load control assembly configured to:
   receive the tower torsion signal,
   determine at least one of a magnitude or an orientation of an asymmetric load acting on the wind turbine based on the tower torsional signal, and
   implement a control action to mitigate the asymmetric load acting on the wind turbine based on at least one of the magnitude or the orientation of the asymmetric load acting on the wind turbine.

2. The wind turbine of claim 1, comprising at least three of the sensors circumferentially spaced apart in a common, generally horizontal plane around the lattice structure tower so as to detect the torsional loading or the torsional movement of the lattice structure tower.

3. The wind turbine of claim 2, wherein the sensors are one of an accelerometer, a pressure sensor, or a strain gauge.

4. The wind turbine of claim 1, wherein the wind turbine further comprises a rotor blade pitch control system, the asymmetric load control assembly in communication with the pitch control system to mitigate the asymmetric load acting on the rotor by altering a pitch angle of the rotor blade.

5. The wind turbine of claim 1, wherein the asymmetric load control assembly is configured to mitigate the asymmetric load based directly on the tower torsion signal.

6. The wind turbine of claim 1, wherein the asymmetric load control assembly further comprises a sensor configured to directly or indirectly detect bending of the main shaft due to asymmetric loading of the rotor, and to generate a corresponding asymmetric load signal, the asymmetric load control assembly configured to mitigate the asymmetric load using the asymmetric load signal and the tower torsion signal.

7. The wind turbine of claim 6, wherein the asymmetric load control assembly is further configured to: i) mitigate the asymmetric load directly based on the asymmetric load signal; and, ii) use the tower torsion signal for validating the asymmetric load signal.

8. A method of operating a wind turbine, the wind turbine including a rotor mounted to a nacelle atop a lattice structure tower, the rotor having a rotatable hub connected to a main shaft and at least one rotor blade, the method comprising:
   generating, via a plurality of tower torsion detection sensors circumferentially spaced about the lattice structure tower, a tower torsion signal, wherein the tower torsion signal is at least one of: i) an actual torsional movement of the lattice structure tower, or, ii) a torsional loading of the lattice structure tower;
   determining, via an asymmetric load control assembly, at least one of a magnitude or an orientation of an asymmetric load acting on the wind turbine based on the tower torsional signal; and
   mitigating the asymmetric load acting on the wind turbine based on at least one of the magnitude or the orientation of the asymmetric load acting on the wind turbine.

9. The method of claim 8, wherein mitigating the asymmetric load includes altering the pitch angle of the at least one rotor blade.

10. The method of claim 8, wherein mitigating the asymmetric load is performed directly based on the tower torsion signal.

11. The method of claim 8, further comprising directly or indirectly detecting bending of the main shaft due to asymmetric loading of the rotor and generating a corresponding asymmetric load signal, wherein the asymmetric load is mitigated using the asymmetric load signal and the tower torsion signal.

12. The method of claim 11, further comprising: mitigating the asymmetric load directly based on the asymmetric load signal; and, using the tower torsion signal for validating the asymmetric load signal.

13. A control system for a wind turbine, the wind turbine having a rotor mounted to a nacelle atop a lattice structure tower, the rotor having a rotatable hub connected to a main shaft and at least one rotor blade, the control system comprising:
    a tower torsion detection system comprising a plurality of sensors circumferentially spaced about the lattice structure tower, the plurality of sensors operably configured to generate a tower torsion signal, wherein the tower torsion signal is at least one of: i) an actual torsional movement of the lattice structure tower, or ii) a torsional loading of the lattice structure tower; and,
    an asymmetric load control assembly configured to: a) receive the tower torsion signal, b) determine at least one of a magnitude or an orientation of an asymmetric load acting on the wind turbine based on the tower torsional signal and, c) implement a control action to mitigate the asymmetric load acting on the rotor based on at least one of the magnitude or the orientation of the asymmetric load acting on the wind turbine.

14. The control system of claim 13, wherein the asymmetric load control assembly is configured to mitigate the asymmetric load based directly on the tower torsion signal.

15. The control system of claim 13, wherein the asymmetric load control assembly further comprises a sensor configured to directly or indirectly detect bending of the main shaft due to asymmetric loading of the rotor, and to generate a corresponding asymmetric load signal, the asymmetric load control assembly is configured to mitigate the asymmetric load using the asymmetric load signal and the tower torsion signal.

16. The control system of claim 13, wherein the asymmetric load control assembly is further configured to: i) mitigate the asymmetric load directly based on the asymmetric load signal; and, ii) use the tower torsion signal for validating the asymmetric load signal.

\* \* \* \* \*